Patented June 23, 1931

1,811,695

UNITED STATES PATENT OFFICE

TULLIO GUIDO LEVI, OF MILAN, ITALY, ASSIGNOR TO SOCIETÀ ITALIANA PIRELLI, OF MILAN, ITALY, A CORPORATION OF ITALY

MANUFACTURE OF RUBBER ARTICLES FROM RUBBER LATEX

No Drawing. Application filed June 20, 1930, Serial No. 462,704, and in Great Britain June 27, 1929.

This invention is for the manufacture of rubber articles from rubber latex, and is a development of the invention of United States Patent No. 1,717,248.

In brief, the process of manufacture of rubber articles from latex according to the said United States specification consists in introducing into rubber latex a coagulant of the type that when added in suitably small proportion to latex does not at the temperature of addition, for example, the ordinary temperature, produce coagulation and at the most a decrease in fluidity, but on appropriate application of heat promotes more or less rapid thickening of the latex followed by coagulation, and subjecting the latex in presence of such coagulant to localized heating to the forming-temperature of the article at the surface or surfaces at which the rubber is to be formed, so as to produce at said surface or surfaces a local thickening of the latex and the formation therefrom of a layer of compact coagulated rubber.

Thus, the said process may be applied to the manufacture of rubber articles by internal or external moulding by bringing into contact latex containing a suitable proportion as aforesaid of a coagulant of the type defined and a heated mould or former, of the shape and size to give the desired article, heated to the forming-temperature, so as to produce at the surface of the mould or former a local thickening of the latex and the formation therefrom upon said surface of a layer of compact coagulated rubber.

By "forming-temperature" is meant the temperature at which the said local thickening and coagulation takes place—the temperature of forming or moulding the article; and "forming" includes moulding.

Operating in the said manner, articles of coherent rubber may be rapidly produced, the thickness of the rubber being determined by the time and the degree of heating. According also to the time and degree of heating, coagulation may be more or less complete, but in any event will be completed on subsequent drying.

Suitable coagulants of the type defined include organic and inorganic substances, and among these are generally to be found those bodies which when introduced in large quantities into latex are apt to coagulate it.

Appropriate inorganic coagulants of the type in question include salts of di-valent and tri-valent bases, such as salts of magnesium, calcium, zinc or aluminium, and ammonium salts of strong acids used in conjunction with oxides of metals of fixed bivalency of Group II of the periodic scheme of lower solubility in water, i. e. those oxides whose solubility in the hydrated state (hydroxides) does not at 95° C. exceed 2 per cent in weight of the solution. Said oxides may be used in a proportion of from about 8-25 grams per litre of the latex. This is the proportion found to be generally utilizable with satisfactory results, but may, of course, be varied according to necessity. The oxides (or hydroxides) of strontium and barium have a dispersing action instead of a thickening and coagulating effect; while mercury oxide is inactive. Oxides of the type of calcium oxide by reason of their ready hydration are not to be distinguished for the purpose in question from the hydroxides; but in the case of others it is doubtful whether they act in the form of hydroxides, and when added in such form are frequently found much less active than the parent oxides. It is therefore advisable always to use the unhydrated oxides as such, although a simple preliminary experiment will suffice to determine the activity or otherwise of the form of any given oxide available, as well as the most advantageous proportion to employ of the particular reagent. The most active oxides are those of magnesium, calcium and zinc and such are the preferred co-operative agents for use with the ammonium salts. Examples of the latter are ammonium chloride, sulphate and nitrate; and the proportion may be about 10-30 grams per litre of the latex. As in the case of the oxides, this represents the generally applicable proportion, and may, likewise, be varied according to need. Mixtures of salts such as those of di- and tri-valent bases may be employed, and also the oxides of the said class may be used individually or in admixture along with the ammonium salts. Acids are in general not suitable coagulants.

Among suitable organic coagulants are aromatic di-substituted guanidines, for example, symm.-diphenylguanidine, symm.-phenyl-o-tolylguanidine, and symm.-di-o-tolylguanidine, and such may be employed in the proportion of from 0.5 to 2.5 per cent.

Such reagents may be added in solution or in suspension in water or other distributing agent or in a latex preservative, such as aqueous ammonia, when the latex taken is unpreserved or is deficient in preservative for the purpose in view.

If, for example, there be added to rubber latex, at a temperature below about 20° C., a very small quantity of a salt of the type described, for example, 3 grams calcium sulphate dissolved or suspended in water per 1000 grams of dry residue of the latex, or one or other of the alternative coagulants or coagulant mixtures mentioned in an appropriate proportion as aforesaid, there may be some thickening, but coagulation does not take place, and if the proportion of coagulant has been suitably adjusted, which is a matter of simple preliminary experiment, the system may be preserved unaltered at or below the temperature stated for a considerable period of time, but if the latex so-treated be brought to a higher temperature below the point of ebullition, for example, to a temperature between 75° and about 100° C.—according to the nature of the latex and the proportion of the coagulant—for instance, by introduction of a heated mould, the degree of thickening increases as the temperature is raised, and with the duration of the heating, until coagulation of the rubber takes place.

Now it has been found that in the manufacture of articles of rubber direct from rubber latex by local heating thereof in presence of a coagulant of the type described according to United States Patent No. 1,717,248 the deposition of rubber, and consequently the production of the article, tends to proceed less advantageously with latex of normal rubber content, that is to say, latex containing up to about 38 per cent of dry rubber, than with concentrated latex. With normal latex the formation of the rubber film or deposit at the heated surface may take place considerably more slowly, and but a limited thickness of rubber may be obtained. In certain cases, however, the employment of normal latex presents special conveniences. For example, mixtures of such latex with compounding ingredients are more stable than like mixtures of concentrated latex, in the absence of dispersing agents other than ammonia. The present invention obviates the disadvantages mentioned, and provides an improved use of normal latex, so that the latter may be easily and satisfactorily employed when it is desired to avoid the operation of concentration or the use of dispersing agents, other than ammonia, which may have an adverse influence on the mechanical properties of the deposited rubber.

According to the present invention, the manufacture of rubber articles direct from normal rubber latex by local heating thereof in presence of a coagulant according to the process of United States Patent No. 1,717,248 is characterized by subjecting the latex, prior to the introduction of the reagent promotive of thickening and coagulation, to a period of moderate heating, followed by cooling.

The latex may be so preheated to a temperature between about 40° to 60° C. for a period of time between half an hour to two hours; but, as will be understood, the temperature and the time are factors which may be varied as circumstances may require, such, for example, as the particular nature of the latex; and the best conditions for a particular case are readily determinable by a simple experiment. If the temperature be too high, deleterious change may be brought about, for example, partial coagulation, while with too low a temperature the time required may be inconveniently long. The limits given represent those found generally practicable.

The cooling must be adequate, and is most conveniently to a temperature ordinarily within the normal range, i. e. 10 to 25° C., and for safety below 30° C.

An anti-coagulant, such as ammonia, may be added as required according to the nature of the latex, and the presence of such a protective agent will usually be found desirable. About 4 promille of ammonia has been found to be generally sufficient for a latex containing from 30 to 38 per cent of dry rubber.

Latex so treated does not undergo any substantial change in general properties. The viscosity shows only a slight increase; the liquid remains fairly fluid, and may be kept for long periods.

To the latex preheated and cooled as aforesaid may be added in conjunction with the promoter of coagulation sulphur or other vulcanizing agents, accelerators, colouring matters, fillers, and other rubber compounding-ingredients as desired. It is generally advisable to allow the latex mixing to stand for some time, say, a few hours, before utilizing it for the actual manufacture of the articles.

The invention may be carried into effect in the manner and with like variations in procedure as described in the aforesaid United States specification No. 1,717,248 and so applied, by operations such as internal or external moulding or extrusion, to the manufacture of articles of multiform kind, such as rubber sheet and rubberized fabric, caps, gloves, teats, rods and tubing.

Example 20 litres of latex of a dry rubber content of about 35 per cent and preserved with 4 promille of ammonia were heated at 45° C. for two hours under gentle agitation, the alkalinity being maintained substantially constant. To the liquid after cooling to room temperature there were added:

200 grams zinc oxide in fine suspension in 200 cc. of water.

300 grams ammonium sulphate in solution in 1200 cc. of water.

400 grams sulphur in fine suspension in 400 cc. of water.

40 grams tetramethylthiuram-disulphide in fine suspension in 200 cc. of water.

After about 5 hours, a form for bathing-caps, previously heated to a temperature of 90° C., was dipped into the dispersion for about 5—8 seconds and then removed. The form was covered with a layer of rubber, which, after drying, was found to be substantially 1 mm. in thickness. In this instance the cap was stripped from the form and vulcanized but vulcanization may also be effected on the form.

It will be appreciated that the above example and also the foregoing details of operative procedure, e. g. as to proportions of reagents and to temperatures, are given for illustrative purposes only and that the invention is not limited thereby. It will also be understood that the term "normal latex" includes its equivalents, that is to say, other aqueous dispersions of caoutchouc—like substances which possess similar properties and behaviour towards coagulants.

Claims:

1. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of moderate heating followed by cooling.

2. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. followed by cooling.

3. In the manufacture of rubber articles direct from normal rubber latex by local heating of the latex in the presence of a coagulent of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of moderate heating followed by cooling to a temperature below 30° C.

4. In the manufacure of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of moderate heating followed by cooling to substantially the normal temperature.

5. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. followed by cooling to a temperature below 30° C.

6. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. followed by cooling to substantially the normal temperature.

7. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of moderate heating followed by cooling, adding the coagulant and allowing the so-treated latex to stand before 8. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of moderate heating followed by cooling, adding the coagulant and rubber compounding-ingredients and allowing the so-treated latex to stand before applying to the manufacture of the article.

9. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. for half an hour to two hours, followed by cooling.

10. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. for half an hour to two hours, followed by cooling to below 30° C.

11. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. for half an hour to two hours, followed by cooling to substantially the normal temperature.

12. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. followed by cooling, adding the coagulant and rubber compounding-ingredients and allowing the so-treated latex to stand before applying to the manufacture of the article.

13. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. followed by cooling to substantially the normal temperature, adding the coagulant and rubber compounding-ingredients and allowing the so-treated latex to stand before applying to the manufacture of the article.

14. In the manufacture of rubber articles direct from normal rubber latex by local heating of the latex in the presence of a coagulant of such nature and in such proportion as to produce at the temperature of addition to the latex at the most a decrease in fluidity and on heating to the forming-temperature thickening and coagulation, the process which comprises subjecting the latex, prior to the introduction of the coagulant, to a period of heating from substantially 40° to 60° C. for half-an-hour to two hours followed by cooling to substantially the normal temperature, adding the coagulant and rubber compounding-ingredients and allowing the so-treated latex to stand before applying to the manufacture of the article.

15. The process of manufacture of rubber articles direct from normal rubber latex which comprises heating normal rubber latex to a moderate temperature, cooling, introducing a coagulant of the type that when added in small proportion produces at the temperature of addition at the most a decrease in fluidity but coagulation on application of heat, and subjecting the latex in presence of said coagulant to local heating to the temperature of coagulation at the surface at which the rubber is to be formed so as there to produce a local thickening of the latex and the formation therefrom at said surface of a layer of compact coagulated rubber.

16. The process of manufacture of rubber articles direct from normal rubber latex which comprises heating normal rubber latex to a moderate temperature, cooling, introducing an inorganic coagulant of the type that when added in small proportion produces at the temperature of addition at the most a decrease in fluidity but coagulation on application of heat, and subjecting the latex in presence of said coagulant to local heating to the temperature of coagulation at the surface at which the rubber is to be formed so as there to produce a local thickening of the latex and the formation therefrom at said surface of a layer of compact coagulated rubber.

17. The process of manufacture of rubber articles direct from normal rubber latex which comprises heating normal rubber latex to a moderate temperature, cooling, introducing an ammonium salt of a strong acid and an oxide of limited water-solubility of a metal of fixed bivalency of Group II of the periodic scheme in such proportion as to produce at the temperature of addition at the most a decrease in fluidity but coagulation on application of heat, and subjecting the latex so additioned to local heating to the temperature of coagulation at the surface at which the rubber is to be formed so as there to produce a local thickening of the latex and the formation therefrom at said surface of a layer of compact coagulated rubber.

18. The process of manufacture of rubber articles direct from normal rubber latex which comprises heating normal rubber latex to a temperature substantially between 40° to 60° C., cooling to below 30° C., introducing an ammonium salt of a strong acid and an oxide of limited water-solubility of a metal of fixed bivalency of Group II of the periodic scheme in such proportion as to produce at the temperature of addition at the most a decrease in fluidity but coagulation on application of heat, and subjecting the latex so additioned to local heating to the temperature of coagulation at the surface at which the rubber is to be formed so as there to produce a local thickening of the latex and the formation therefrom at said surface of a layer of compact coagulated rubber.

19. The process of manufacture of rubber articles direct from normal rubber latex which comprises heating normal rubber latex to a temperature substantially between 40° to 60° C., cooling to substantially normal temperature, introducing an ammonium salt of a strong acid and an oxide of limited water-solubility of a metal of fixed bivalency of Group II of the periodic scheme in such proportion as to produce at the temperature of addition at the most a decrease in fluidity but coagulation on application of heat, and subjecting the latex so additioned to local heating to the temperature of coagulation at the surface at which the rubber is to be formed so as there to produce a local thickening of the latex and the formation therefrom at said surface of a layer of compact coagulated rubber.

20. The process of manufacture of rubber articles direct from normal rubber latex which comprises heating normal rubber latex to a temperature substantially between 40° to 60°C., cooling to below 30° C., introducing rubber compounding-ingredients and an ammonium salt of a strong acid and an oxide of limited water-solubility of a metal of fixed bivalency of Group II of the periodic scheme, said salt and oxide being in such proportion as to produce at the temperature of addition at the most a decrease in fluidity but coagulation on application of heat, and subjecting the latex so additioned to local heating to the temperature of coagulation at the surface at which the rubber is to be formed so as there to produce a local thickening of the latex and the formation therefrom at said surface of a layer of compact coagulated rubber.

21. The process of manufacture of rubber articles direct from normal rubber latex which comprises heating normal rubber latex to a temperature substantially between 40° to 60° C., cooling to below 30° C., introducing rubber compounding-ingredients and an ammonium salt of a strong acid and an oxide of limited water-solubility of a metal of fixed bivalency of Group II of the periodic scheme, said salt and oxide being in such proportion as to produce at the temperature of addition at the most a decrease in fluidity but coagulation on application of heat, allowing the latex-mixing to stand, and then subjecting the latex so additioned to local heating to the temperature of coagulation at the surface at which the rubber is to be formed so as there to produce a local thickening of the latex and the formation therefrom at said surface of a layer of compact coagulated rubber.

22. The process of manufacture of rubber articles direct from normal rubber latex which comprises heating normal rubber latex to a temperature substantially between 40° to 60° C. for a period of time between half an hour and two hours, cooling to below 30° C., introducing an ammonium salt of a strong acid and an oxide of limited water-solubility of a metal of fixed bivalency of Group II of the periodic scheme in such proportion as to produce at the temperature of addition at the most a decrease in fluidity but coagulation on application of heat, and subjecting the latex so additioned to local heating to the temperature of coagulation at the surface at which the rubber is to be formed so as there to produce a local thickening of the latex and the formation therefrom at said surface of a layer of compact coagulated rubber.

23. The process of manufacture of rubber articles direct from normal rubber latex which comprises heating normal rubber latex to a temperature substantially between 40° to 60° C. for a period of time between half an hour to two hours, cooling to below 30° C., introducing rubber compounding-ingredients and an ammonium salt of a strong acid and an oxide of limited water-solubility of a metal of fixed bivalency of Group II of the periodic scheme, said salt and oxide being in such proportion as to produce at the temperature of addition at the most a decrease in fluidity but coagulation on application of heat, allowing the latex-mixing to stand and subjecting the latex so additioned to local heating to the temperature of coagulation at the surface at which the rubber is to be formed so as there to produce a local thickening of the latex and the formation therefrom at said surface of a layer of compact coagulated rubber.

24. The process of manufacture of rubber articles direct from normal rubber latex which comprises heating normal rubber latex to a temperature substantially between 40° to 60° C., for a period of time between half an hour to two hours, cooling to substantially normal temperature, introducing rubber compounding-ingredients and an ammonium salt of a strong acid and an oxide of limited water-solubility of a metal of fixed bivalency of Group II of the periodic scheme, said salt and oxide being in such proportion as to produce at the temperature of addition at the most a decrease in fluidity but coagulation on application of heat, allowing the latex-mixing to stand and subjecting the latex so additioned to local heating to the temperature of coagulation at the surface at which the rubber is to be formed so as there to produce a local thickening of the latex and the formation therefrom at said surface of a layer of compact coagulated rubber.

25. The process of manufacture of rubber articles direct from normal rubber latex which comprises heating normal rubber latex to a moderate temperature, cooling, adding compounding-ingredients and a coagulant of the type that when introduced in small proportions produces at the temperature of addition at the most a decrease in fluidity but coagulation on application of heat, leaving the mixing to stand, and then subjecting the mixing to local heating to the temperature of coagulation at the surface at which the rubber is to be formed so as there to produce a local thickening of the latex and the formation therefrom at said surface of a layer of compact coagulated rubber.

TULLIO GUIDO LEVI.